(12) United States Patent
Li

(10) Patent No.: US 11,733,480 B2
(45) Date of Patent: Aug. 22, 2023

(54) CAMERA OPTICAL LENS

(71) Applicant: AAC Optics (Changzhou) Co., Ltd., Changzhou (CN)

(72) Inventor: Hongye Li, Shenzhen (CN)

(73) Assignee: AAC Optics (Changzhou) Co., Ltd., Changzhou (CN)

( * ) Notice: Subject to any disclaimer, the term of this patent is extended or adjusted under 35 U.S.C. 154(b) by 447 days.

(21) Appl. No.: 17/129,935

(22) Filed: Dec. 22, 2020

(65) Prior Publication Data

US 2021/0302701 A1    Sep. 30, 2021

(30) Foreign Application Priority Data

Mar. 30, 2020   (CN) .......................... 202010233720.8

(51) Int. Cl.
   *G02B 9/60*      (2006.01)
   *G02B 13/00*     (2006.01)

(52) U.S. Cl.
   CPC ........... *G02B 9/60* (2013.01); *G02B 13/0045* (2013.01)

(58) Field of Classification Search
   None
   See application file for complete search history.

(56) References Cited

U.S. PATENT DOCUMENTS

| | | | | |
|---|---|---|---|---|
| 2012/0105704 | A1* | 5/2012 | Huang ................... | G02B 13/18 348/340 |
| 2012/0300315 | A1* | 11/2012 | Chen ................... | G02B 13/0045 359/714 |
| 2013/0021680 | A1* | 1/2013 | Chen ................... | G02B 13/0045 359/714 |
| 2013/0100542 | A1* | 4/2013 | Tsai ................... | G02B 13/0045 359/714 |
| 2017/0102524 | A1* | 4/2017 | Jo ....................... | G02B 27/0075 |

* cited by examiner

*Primary Examiner* — Darryl J Collins
(74) *Attorney, Agent, or Firm* — W&G Law Group

(57) ABSTRACT

A camera optical lens includes first to fifth lenses. The camera optical lens satisfies: $0.75 \le f1/f \le 0.95$; $-4.50 \le f3/f \le -3.00$; $2.00 \le (R5+R6)/(R5-R6) \le 8.00$; $3.00 \le d7/d5 \le 5.00$; and $-12.00 \le R3/R4 \le -2.50$, where f denotes a focal length of the camera optical lens; f1 denotes a focal length of the first lens; f3 denotes a focal length of the third lens; R3 and R4 respectively denote curvature radiuses of an object side surface and an image side surface of the second lens; R5 and R6 respectively denote curvature radiuses of an object side surface and an image side surface of the third lens; and d5 and d7 respectively denote an on-axis thickness of the third lens and an on-axis thickness of the fourth lens. The camera optical lens can achieve good optical performance while satisfying design requirements for ultra-thin, wide-angle lenses having large apertures.

10 Claims, 8 Drawing Sheets

CAMERA OPTICAL LENS

TECHNICAL FIELD

The present disclosure relates to the field of optical lens, and more particularly, to a camera optical lens suitable for handheld terminal devices such as smart phones or digital cameras and camera devices such as monitors or PC lenses.

BACKGROUND

With the development of camera technology, camera optical lenses are widely applied in various electronic products, such as smart phones and digital cameras. For the purpose of portability, people are increasingly pursuing thinner and lighter electronic products, and thus miniature camera lenses with good imaging quality therefore have become a mainstream in the market.

In order to obtain better imaging quality, the lens that is conventionally equipped in mobile phone cameras adopts a three-piece or four-piece lens structure. However, with the development of technology and the increasingly diverse demands of users, the pixel area of photosensitive devices is becoming smaller and smaller and the requirement of the system on the imaging quality is increasingly higher, such that a five-piece lens structure gradually emerges in lens designs. Although the common five-piece lens has good optical performance, its settings on refractive power, lens spacing and lens shape still have some irrationality, which results in that the lens structure cannot achieve a good optical performance while satisfying design requirements for wide-angle and ultra-thin lenses.

Therefore, it is urgent to provide a camera optical lens that has good optical performance and satisfies the requirements of wide-angle, and ultra-thin design.

SUMMARY

In view of the above problems, the present disclosure provides a camera optical lens, which can solve the problem that conventional camera optical lenses are not fully ultra-thinned and wide-angled.

In an embodiment, the present disclosure provides a camera optical lens includes, from an object side to an image side, a first lens having a positive refractive power, a second lens having a negative refractive power, a third lens having a negative refractive power, a fourth lens having a positive refractive power, and a fifth lens having a negative refractive power. The camera optical lens satisfies following conditions: $0.75 \leq f1/f \leq 0.95$; $-4.50 \leq f3/f \leq -3.00$; $2.00 \leq (R5+R6)/(R5-R6) \leq 8.00$; $3.00 \leq d7/d5 \leq 5\ 0.00$; and $-12.00 \leq R3/R4 \leq -2.50$, where f denotes a focal length of the camera optical lens; f1 denotes a focal length of the first lens; f3 denotes a focal length of the third lens; R3 denotes a curvature radius of an object side surface of the second lens; R4 denotes a curvature radius of an image side surface of the second lens; R5 denotes a curvature radius of an object side surface of the third lens; R6 denotes a curvature radius of an image side surface of the third lens; d5 denotes an on-axis thickness of the third lens; and d7 denotes an on-axis thickness of the fourth lens.

As an improvement, the camera optical lens further satisfies a following condition of $0.10 \leq R1/R2 \leq 0.50$, where R1 denotes a curvature radius of an object side surface of the first lens; and R2 denotes a curvature radius of an image side surface of the first lens.

As an improvement, the camera optical lens further satisfies following conditions: $-5.55 \leq (R1+R2)/(R1-R2) \leq -0.84$; and $0.06 \leq d1/TTL \leq 0.25$, where R1 denotes a curvature radius of an object side surface of the first lens; R2 denotes a curvature radius of an image side surface of the first lens; d1 denotes an on-axis thickness of the first lens; and TTL denotes a total optical length from the object side surface of the first lens to an image plane of the camera optical lens along an optic axis.

As an improvement, the camera optical lens further satisfies following conditions: $-128.92 \leq f2/f \leq -1.44$; $0.22 \leq (R3+R4)/(R3-R4) \leq 1.27$; and $0.02 \leq d3/TTL \leq 0.07$, where f2 denotes a focal length of the second lens; d3 denotes an on-axis thickness of the second lens; and TTL denotes a total optical length from an object side surface of the first lens to an image plane of the camera optical lens along an optic axis.

As an improvement, the camera optical lens further satisfies a following condition of $0.02 \leq d5/TTL \leq 0.10$, where TTL denotes a total optical length from an object side surface of the first lens to an image plane of the camera optical lens along an optic axis.

As an improvement, the camera optical lens further satisfies following conditions: $0.46 \leq f4/f \leq 3.90$; $0.66 \leq (R7+R8)/(R7-R8) \leq 3.01$; and $0.10 \leq d7/TTL \leq 0.37$, where f4 denotes a focal length of the fourth lens; R7 denotes a curvature radius of an object side surface of the fourth lens; R8 denotes a curvature radius of an image side surface of the fourth lens; and TTL denotes a total optical length from an object side surface of the first lens to an image plane of the camera optical lens along an optic axis.

As an improvement, the camera optical lens further satisfies following conditions: $-3.64 \leq f5/f \leq -0.52$; $0.87 \leq (R9+R10)/(R9-R10) \leq 3.12$; and $0.05 \leq d9/TTL \leq 0.22$, where f5 denotes a focal length of the fifth lens; R9 denotes a curvature radius of an object side surface of the fifth lens; R10 denotes a curvature radius of an image side surface of the fifth lens; d9 denotes an on-axis thickness of the fifth lens; and TTL denotes a total optical length from an object side surface of the first lens to an image plane of the camera optical lens along an optic axis.

As an improvement, the camera optical lens further satisfies a following condition of $TTL/IH \leq 1.38$, where IH denotes an image height of the camera optical lens; and TTL denotes a total optical length from an object side surface of the first lens to an image plane of the camera optical lens along an optic axis.

As an improvement, the camera optical lens further satisfies a following condition of $FOV \geq 80°$, where FOV denotes a field of view of the camera optical lens.

As an improvement, the camera optical lens further satisfies a following condition of $0.48 \leq f12/f \leq 1.68$, where f12 denotes a combined focal length of the first lens and the second lens.

The present disclosure has advantageous effects as below.

The camera optical lens according to the present disclosure achieves good optical performance while satisfying design requirements for ultra-thin, wide-angle lenses, especially suitable for camera lens assembly of mobile phones and WEB camera lenses formed by CCD, CMOS and other imaging elements for high pixels.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

The present disclosure will hereinafter be described in detail with reference to several exemplary embodiments.

To make the technical problems to be solved, technical solutions and beneficial effects of the present disclosure more apparent, the present disclosure is described in further detail together with the figure and the embodiments. It should be understood the specific embodiments described hereby is only to explain the disclosure, not intended to limit the disclosure.

Embodiment 1

Figure 1:
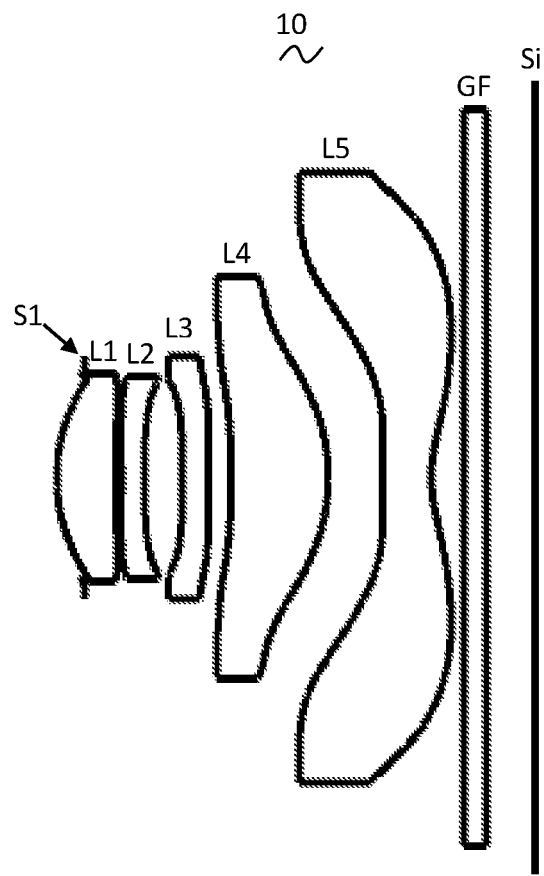
FIG. 1 is a schematic diagram of a structure of a camera optical lens according to Embodiment 1 of the present disclosure.

Referring to FIG. 1-4, the present disclosure provides a camera optical lens 10 in Embodiment 1. In FIG. 1, a left side is an object side, and a right side is an image side. The camera optical lens 10 mainly includes, from an object side to an image side, an aperture S1, a first lens L1, a second lens L2, a third lens L3, a fourth lens L4, and a fifth lens L5. A glass filter (GF) is arranged between the fifth lens L5 and an image plane Si, and the glass filter (GF) can be a glass plate or can be an optical filter.

In the present embodiment, the first lens L1 has a positive refractive power, the second lens L2 has a negative refractive power, the third lens L3 has a negative refractive power, the fourth lens L4 has a positive refractive power, and the fifth lens L5 has a negative refractive power.

In the present embodiment, the first lens L1 is made of a plastic material, the second lens L2 is made of a plastic material, the third lens L3 is made of a plastic material, the fourth lens L4 is made of a plastic material, the fifth lens L5 is made of a plastic material, and the sixth lens L6 is made of a plastic material.

Here, a focal length of the camera optical lens 10 is defined as f, a focal length of the first lens L1 is defined as f1, a focal length of the third lens L3 is f3, a curvature radius of an object side surface of the second lens L2 is defined as R3, a curvature radius of an image side surface of the second lens L2 is defined as R4, a curvature radius of an object side surface of the third lens L3 is defined as R5, a curvature radius of an image side surface of the third lens L3 is defined as R6, an on-axis thickness of the third lens L3 is defined as d5, and an on-axis thickness of the fourth lens L4 is defined as d7. The camera optical lens 10 should satisfy following conditions:

$$0.75 \leq f1/f \leq 0.95 \quad (1);$$

$$-4.50 \leq f3/f \leq -3.00 \quad (2);$$

$$2.00 \leq (R5+R6)/(R5-R6) \leq 8.00 \quad (3);$$

$$3.00 \leq d7/d5 \leq 5.00 \quad (4); \text{ and}$$

$$-12.00 \leq R3/R4 \leq -2.50 \quad (5).$$

The condition (1) specifies a ratio of the focal length f1 of the first lens L1 to the focal length of the system, which can effectively balance a spherical aberration and the field curvature of the system.

The condition (2) specifies a ratio of the focal length f3 of the third lens L3 to the focal length of the system. The appropriate distribution of the focal length leads to better imaging quality and a lower sensitivity of the system.

The condition (3) specifies a shape of the third lens L3. This condition can facilitate the correction of an off-axis aberration with development towards ultra-thin, wide-angle lenses.

The condition (4) specifies a ratio of a thickness of the fourth lens L4 to a thickness of the third lens L3. This condition can facilitate compressing a total optical length and achieving an ultra-thinning effect.

The condition (5) specifies the shape of the second lens L2. This condition can alleviate the deflection of light passing through the lens while effectively reducing aberrations.

A curvature radius of an object side surface of the first lens L1 is defined as R1, and a curvature radius of an image side surface of the first lens L1 is defined as R2. The camera optical lens 10 should satisfy a condition of $0.10 \leq R1/R2 \leq 0.50$, which specifies a shape of the first lens L1. This condition can alleviate the deflection of light passing through the lens while effectively reducing aberrations.

In the present embodiment, the first lens L1 includes an object side surface being convex in a paraxial region, and an image side surface being concave in the paraxial region.

The curvature radius of the object side surface of the first lens L1 is defined as R1, and the curvature radius of the image side surface of the first lens L1 is defined as R2. The camera optical lens 10 should satisfy a condition of $-5.55 \leq (R1+R2)/(R1-R2) \leq -0.84$. This condition can appropriately control a shape of the first lens L1, allowing the first lens L1 to effectively correct spherical aberrations of the system. As an example, $-3.47 \leq (R1+R2)/(R1-R2) \leq -1.05$.

An on-axis thickness of the first lens L1 is defined as d1, and a total optical length from the object side surface of the first lens L1 to an image plane of the camera optical lens along an optic axis is defined as TTL. The camera optical lens 10 should satisfy a condition of $0.06 \leq d1/TTL \leq 0.25$, which can achieve the ultra-thin lenses. As an example, $0.10 \leq d1/TTL \leq 0.20$.

In the present embodiment, the second lens L2 includes an object side surface being concave in a paraxial region, and an image side surface being concave in the paraxial region.

A focal length of the camera optical lens 10 is defined as f, and a focal length of the second lens L2 is defined as f2. The camera optical lens 10 should satisfy a condition of $-128.92 \leq f2/f \leq -1.44$. By controlling the negative refractive power of the second lens L2 in an appropriate range, the aberration of the optical system can be advantageously corrected. As an example, $-80.57 \leq f2/f \leq -1.80$.

A curvature radius of the object side surface of the second lens L2 is defined as R3, and a curvature radius of the image side surface of the second lens L2 is defined as R4. The camera optical lens 10 should satisfy a condition of $0.22 \leq (R3+R4)/(R3-R4) \leq 1.27$, which specifies a shape of the second lens L2. This condition can facilitate the correction of an on-axis aberration with the development towards ultra-thin, wide-angle lenses. As an example, $0.35 \leq (R3+R4)/(R3-R4) \leq 1.01$.

An on-axis thickness of the second lens L2 is defined as d3, and the total optical length from the object side surface of the first lens L1 to an image plane of the camera optical lens 10 along an optic axis is defined as TTL. The camera optical lens 10 should satisfy a condition of $0.02 \leq d3/TTL \leq 0.07$, which can achieve the ultra-thin lenses. As an example, $0.04 \leq d3/TTL \leq 0.06$.

In the present embodiment, the third lens L3 includes an object side surface being convex in a paraxial region, and an image side surface being concave in the paraxial region.

The on-axis thickness of the third lens L3 is defined as d5, and the total optical length from the object side surface of the first lens L1 to an image plane of the camera optical lens 10 along an optic axis is defined as TTL. The camera optical lens 10 should satisfy a condition of $0.02 \leq d5/TTL \leq 0.10$, which can achieve the ultra-thin lenses. As an example, $0.04 \leq d5/TTL \leq 0.08$.

In the present embodiment, the fourth lens L4 includes an object side surface being concave in a paraxial region, and an image side surface being convex in the paraxial region.

A focal length of the fourth lens L4 is f4, and the focal length of the camera optical lens 10 is f. The camera optical lens 10 further satisfies a condition of $0.46 \leq f4/f \leq 3.90$, which specifies a ratio of the focal length f4 of the fourth lens L4 to the focal length of the system. This condition facilitates improving the performance of the optical system. As an example, $0.74 \leq f4/f \leq 3.12$.

A curvature radius of an object side surface of the fourth lens L4 is defined as R7, and a curvature radius of an image side surface of the fourth lens L4 is defined as R8. The camera optical lens 10 should satisfy a condition of $0.66 \leq (R7+R8)/(R7-R8) \leq 3.01$, which specifies a shape of the fourth lens L4. This condition can facilitate the correction of an off-axis aberration with the development towards ultra-thin, wide-angle lenses. As an example, $1.06 \leq (R7+R8)/(R7-R8) \leq 2.41$.

The on-axis thickness of the fourth lens L4 is defined as d7, and the total optical length from the object side surface of the first lens L1 to an image plane of the camera optical lens 10 along an optic axis is defined as TTL. The camera optical lens 10 should satisfy a condition of $0.10 \leq d7/TTL \leq 0.37$, which can achieve the ultra-thin lenses. As an example, $0.16 \leq d7/TTL \leq 0.29$.

In the present embodiment, the fifth lens L5 includes an object side surface being convex in a paraxial region, and an image side surface being concave in the paraxial region.

A focal length of the fifth lens L5 is f5, and the focal length of the camera optical lens 10 is f. The camera optical lens 10 further satisfies a condition of $-3.64 \leq f5/f \leq -0.52$. The limitations on the fifth lens L5 can effectively make a light angle of the camera optical lens 10 gentle and reduce the tolerance sensitivity. As an example, $-2.27 \leq f5/f \leq -0.66$.

A curvature radius of the object side surface of the fifth lens L5 is defined as R9, and a curvature radius of the image side surface of the fifth lens L5 is defined as R10. The camera optical lens 10 should satisfy a condition of $0.87 \leq (R9+R10)/(R9-R10) \leq 3.12$, which specifies a shape of the fifth lens L5. This condition can facilitate the correction of an off-axis aberration with the development towards ultra-thin, wide-angle lenses. As an example, $1.40 \leq (R9+R10)/(R9-R10) \leq 2.50$.

An on-axis thickness of the fifth lens L5 is defined as d9, and the total optical length from the object side surface of the first lens L1 to an image plane of the camera optical lens 10 along an optic axis is defined as TTL. The camera optical lens 10 should satisfy a condition of $0.05 \leq d9/TTL \leq 0.22$. This condition can facilitate achieving ultra-thin lenses. As an example, $0.07 \leq d9/TTL \leq 0.18$.

In the present embodiment, the camera optical lens 10 has an image height of IH satisfying a condition of $TTL/IH \leq 1.38$, which can achieve the ultra-thin lenses.

In the present embodiment, a field of view (FOV) of the camera optical lens 10 is larger than or equal to 80°, thereby achieving a wide angle.

In the present embodiment, the focal length of the camera optical lens 10 is defined as f, and a combined focal length of the first lens L1 and the second lens L2 is defined as f12. The camera optical lens 10 should satisfy a condition of $0.48 \leq f12/f \leq 1.68$. This condition can eliminate aberration and distortion of the camera optical lens 10, suppress the back focal length of the camera optical lens 10, and maintain miniaturization of the camera lens system group. As an example, $0.76 \leq f12/f \leq 1.34$.

In addition, in the camera optical lens 10 provided by the present embodiment, the surface of each lens can be set as an aspherical surface, and it is easy for the aspherical surface to be made into a shape other than a spherical surface, to obtain more control variables for reducing aberrations, thereby reducing the number of lenses used, so that the total length of the camera optical lens 10 can be effectively reduced. In the present embodiment, both the object side surface and the image side surface of each lens are aspherical surfaces.

It should be understood that since the first lens L1, the second lens L2, the third lens L3, the fourth lens L4, and the fifth lens L5 have the structure and parameter relationship as described above, the camera optical lens 10 can appropriately distribute the refractive power, spacing and shape of each lens, and thus various aberrations are corrected.

Thus, the camera optical lens 10 can further satisfy design requirements for ultra-thin, wide-angle lenses having large apertures while achieving good optical performance.

The following examples will be used to describe the camera optical lens 10 of the present disclosure. The symbols recorded in each example will be described as follows. The focal length, on-axis distance, curvature radius, on-axis thickness, inflexion point position, and arrest point position are all in units of mm.

TTL: total optical length (total optical length from the object side surface of the first lens L1 to the image plane Si of the camera optical lens along the optic axis) in mm.

In addition, an inflection point and/or an arrest point are provided on at least one of the object side surface and the image side surface of each lens, in order to meet the requirements of high-quality imaging, and the specific implementations are described below.

The design data of the camera optical lens 10 shown in FIG. 1 is shown below.

Table 1 includes the curvature radius of the object side surface and the curvature radius R of the image side surface of the first lens L1 to the fifth lens L5 that constitute the camera optical lens 10 in the Embodiment 1 of the present disclosure, the on-axis thickness of each lens, the distance d between adjacent lenses, refractive index nd and abbe number vd. It should be noted that R and d are both in units of millimeter (mm).

TABLE 1

|  | R |  | d |  | nd |  | vd |
|---|---|---|---|---|---|---|---|
| S1 | ∞ | d0 = | −0.257 |  |  |  |  |
| R1 | 1.370 | d1 = | 0.543 | nd1 | 1.5444 | v1 | 55.82 |
| R2 | 8.911 | d2 = | 0.057 |  |  |  |  |
| R3 | −30.573 | d3 = | 0.210 | nd2 | 1.6610 | v2 | 20.53 |
| R4 | 6.727 | d4 = | 0.346 |  |  |  |  |
| R5 | 13.034 | d5 = | 0.240 | nd3 | 1.6610 | v3 | 20.53 |
| R6 | 5.314 | d6 = | 0.217 |  |  |  |  |
| R7 | −10.859 | d7 = | 0.901 | nd4 | 1.5444 | v4 | 55.82 |
| R8 | −1.592 | d8 = | 0.501 |  |  |  |  |
| R9 | 3.896 | d9 = | 0.454 | nd5 | 1.5444 | v5 | 55.82 |
| R10 | 1.060 | d10 = | 0.300 |  |  |  |  |
| R11 | ∞ | d11 = | 0.210 | ndg | 1.5168 | vg | 64.17 |
| R12 | ∞ | d12 = | 0.444 |  |  |  |  |

In the table, meanings of various symbols will be described as follows.

S1: aperture;
R: a central curvature radius for a lens;
R1: curvature radius of the object side surface of the first lens L1;
R2: curvature radius of the image side surface of the first lens L1;
R3: curvature radius of the object side surface of the second lens L2;
R4: curvature radius of the image side surface of the second lens L2;
R5: curvature radius of the object side surface of the third lens L3;
R6: curvature radius of the image side surface of the third lens L3;
R7: curvature radius of the object side surface of the fourth lens L4;
R8: curvature radius of the image side surface of the fourth lens L4;
R9: curvature radius of the object side surface of the fifth lens L5;
R10: curvature radius of the image side surface of the fifth lens L5;
R11: curvature radius of an object side surface of the optical filter GF;
R12: curvature radius of an image side surface of the optical filter GF;
d: on-axis thickness of a lens and an on-axis distance between lenses;
d0: on-axis distance from the aperture S1 to the object side surface of the first lens L1;
d1: on-axis thickness of the first lens L1;
d2: on-axis distance from the image side surface of the first lens L1 to the object side surface of the second lens L2;
d3: on-axis thickness of the second lens L2;
d4: on-axis distance from the image side surface of the second lens L2 to the object side surface of the third lens L3;
d5: on-axis thickness of the third lens L3;
d6: on-axis distance from the image side surface of the third lens L3 to the object side surface of the fourth lens L4;
d7: on-axis thickness of the fourth lens L4;
d8: on-axis distance from the image side surface of the fourth lens L4 to the object side surface of the fifth lens L5;
d9: on-axis thickness of the fifth lens L5;
d10: on-axis distance from the image side surface of the fifth lens L5 to the object side surface of the optical filter GF;
d11: on-axis thickness of the optical filter GF;
d12: on-axis distance from the image side surface of the optical filter GF to the image plane;
nd: refractive index of d line (when the d line is green light with a wavelength of 550 nm);
nd1: refractive index of d line of the first lens L1;
nd2: refractive index of d line of the second lens L2;
nd3: refractive index of d line of the third lens L3;
nd4: refractive index of d line of the fourth lens L4;
nd5: refractive index of d line of the fifth lens L5;
ndg: refractive index of d line of the optical filter GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
vg: abbe number of the optical filter GF.

Table 2 shows aspheric surface data of respective lens in the camera optical lens 10 according to Embodiment 1 of the present disclosure.

TABLE 2

|  | Conic coefficient | Aspherical surface coefficients | | | | | | | | |
|---|---|---|---|---|---|---|---|---|---|---|
|  | k | A4 | A6 | A8 | A10 | A12 | A14 | A16 | A18 | A20 |
| R1 | 1.6822E−01 | 1.1640E−02 | −3.4005E−01 | 2.9601E+00 | −1.5201E+01 | 4.7175E+01 | −9.0705E+01 | 1.0507E+02 | −6.7232E+01 | 1.8202E+01 |
| R2 | −5.8728E+00 | −3.5451E−02 | −5.7815E−01 | 4.9387E+00 | −1.6849E+01 | 2.5931E+01 | −9.2590E+00 | −2.5019E+01 | 3.3033E+01 | −1.2320E+01 |
| R3 | −3.4800E+02 | 4.9650E−02 | −8.7120E−01 | 9.3046E+00 | −4.1038E+01 | 1.0294E+02 | −1.5700E+02 | 1.4480E+02 | −7.4636E+01 | 1.6671E+01 |
| R4 | 4.8513E+01 | −2.8443E−02 | 1.0313E+00 | −7.6392E+00 | 4.4088E+01 | −1.6230E+02 | 3.6938E+02 | −5.0198E+02 | 3.7386E+02 | −1.1742E+02 |
| R5 | 1.7543E+01 | −4.9862E−01 | 2.0726E+00 | −1.4744E+01 | 7.2286E+01 | −2.3198E+02 | 4.7669E+02 | −6.0428E+02 | 4.3069E+02 | −1.3217E+02 |
| R6 | 2.3452E+01 | −4.3712E−01 | 8.1485E−01 | −2.5007E+00 | 6.4297E+00 | −1.1826E+01 | 1.4773E+01 | −1.1716E+01 | 5.3103E+00 | −1.0553E+00 |
| R7 | 5.1117E+01 | −1.6375E−01 | 2.9591E−01 | −6.5297E−01 | 1.1818E+00 | −1.2457E+00 | 7.7657E−01 | −2.8747E−01 | 5.8625E−02 | −5.0625E−03 |
| R8 | −3.9458E−01 | −1.0389E−01 | 2.1527E−01 | −2.3914E−01 | 1.5656E−01 | −2.4192E−02 | −2.3942E−02 | 1.3856E−02 | −2.8910E−03 | 2.2021E−04 |
| R9 | −9.9000E+01 | −5.1445E−01 | 5.6773E−01 | −4.7058E−01 | 2.8460E−01 | −1.1870E−01 | 3.2833E−02 | −5.7010E−03 | 5.5930E−04 | −2.3577E−05 |
| R10 | −7.4317E+00 | −1.7608E−01 | 1.4616E−01 | −8.6782E−02 | 3.4823E−02 | −9.4918E−03 | 1.7268E−03 | −2.0034E−04 | 1.3356E−05 | −3.8709E−07 |

In Table 2, k is a conic coefficient, and A4, A6, A8, A10, A12, A14, A16, A18, and A20 are aspheric surface coefficients.

IH: image height $$y=(x^2/R)/\{1+[1-(k+1)(x^2/R^2)]^{1/2}\}+A4x^4+A6x^6+A8x^8+ \\ A10x^{10}+A12x^{12}+A14x^{14}+A16x^{16}+A18x^{18}+A20x^{20} \qquad (6)$$

where x is a vertical distance between a point on an aspherical curve and the optic axis, and y is an aspherical depth (a vertical distance between a point on an aspherical surface, having a distance of x from the optic axis, and a surface tangent to a vertex of the aspherical surface on the optic axis).

In the present embodiment, an aspheric surface of each lens surface uses the aspheric surfaces represented by the above condition (6). However, the present disclosure is not limited to the aspherical polynomial form represented by the condition (6).

Table 3 and Table 4 show design data of inflexion points and arrest points of respective lens in the camera optical lens 10 of the present embodiment. P1R1 and P1R2 represent the object side surface and the image side surface of the first lens L1, respectively; P2R1 and P2R2 represent the object side surface and the image side surface of the second lens L2, respectively; P3R1 and P3R2 represent the object side surface and the image side surface of the third lens L3, respectively; P4R1 and P4R2 represent the object side surface and the image side surface of the fourth lens L4, respectively; and P5R1 and P5R2 represent the object side surface and the image side surface of the fifth lens L5, respectively. The data in the column "inflexion point position" indicates vertical distances from inflexion points arranged on each lens surface to the optic axis of the camera optical lens 10. The data in the column "arrest point position" indicates vertical distances from arrest points arranged on each lens surface to the optic axis of the camera optical lens 10.

TABLE 3

| | Number of inflexion points | Inflexion point position 1 | Inflexion point position 2 | Inflexion point position 3 |
|---|---|---|---|---|
| P1R1 | 1 | 0.815 | / | / |
| P1R2 | 1 | 0.525 | / | / |
| P2R1 | 1 | 0.285 | / | / |
| P2R2 | 0 | / | / | / |
| P3R1 | 1 | 0.125 | / | / |
| P3R2 | 2 | 0.215 | 0.865 | / |
| P4R1 | 2 | 0.815 | 1.205 | / |
| P4R2 | 2 | 1.015 | 1.545 | / |
| P5R1 | 3 | 0.185 | 1.435 | 2.125 |
| P5R2 | 2 | 0.465 | 2.465 | / |

TABLE 4

| | Number of arrest points | Arrest point position 1 |
|---|---|---|
| P1R1 | 0 | / |
| P1R2 | 1 | 0.695 |
| P2R1 | 1 | 0.395 |
| P2R2 | 0 | / |
| P3R1 | 1 | 0.215 |
| P3R2 | 1 | 0.395 |
| P4R1 | 0 | / |
| P4R2 | 0 | / |
| P5R1 | 1 | 0.335 |
| P5R2 | 1 | 1.235 |

Table 13 below further lists various values of Embodiments 1, 2 and 3 and parameters which are specified in the above conditions.

As shown in Table 3, Embodiment 1 satisfies the various conditions.

Figure 2:
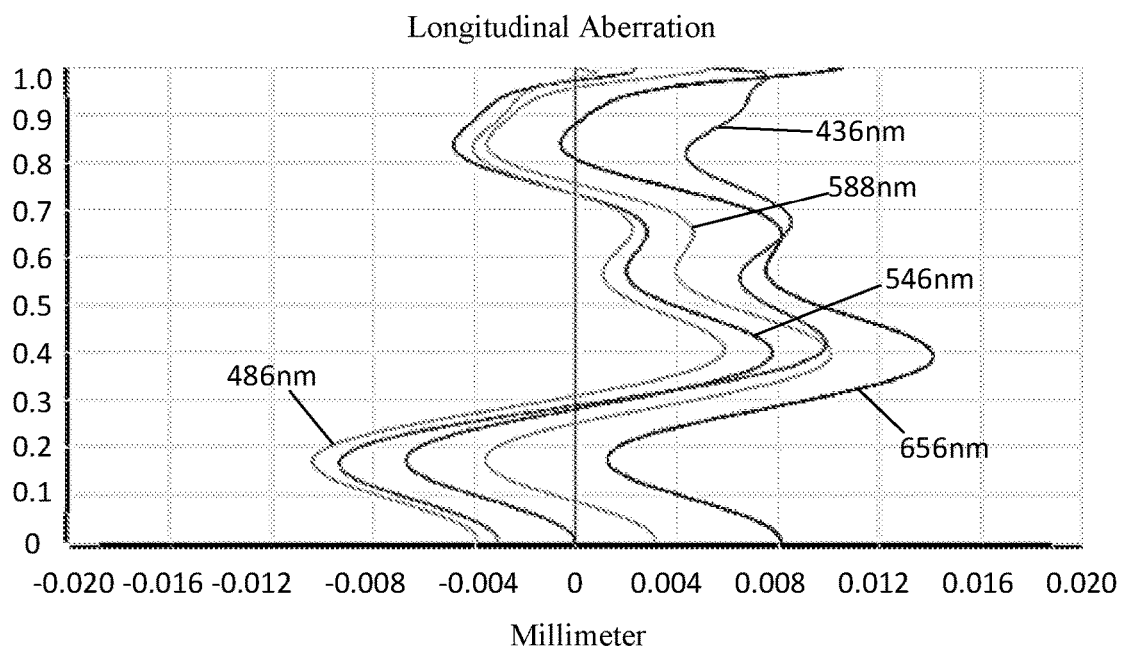
FIG. 2 is a schematic diagram of a longitudinal aberration of the camera optical lens shown in FIG. 1.
Figure 3:
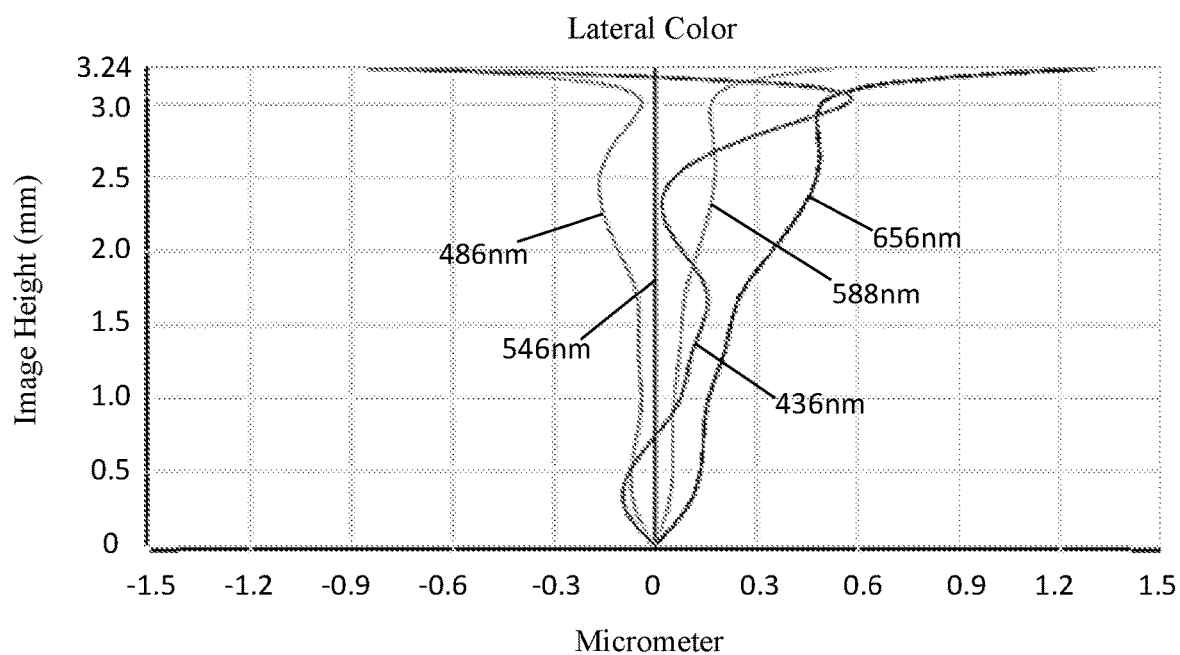
FIG. 3 is a schematic diagram of a lateral color of the camera optical lens shown in FIG. 1.
Figure 4:
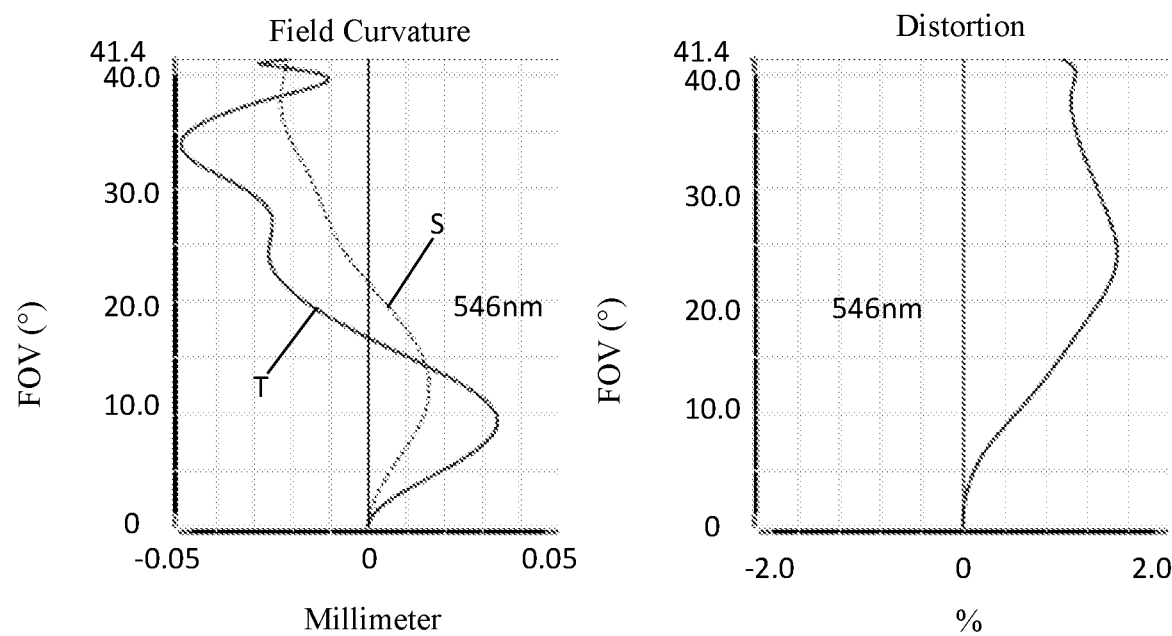
FIG. 4 is a schematic diagram of a field curvature and a distortion of the camera optical lens shown in FIG. 1.

FIG. 2 and FIG. 3 illustrate a longitudinal aberration and a lateral color of light with wavelengths of 656 nm, 588 nm, 546 nm, 486 nm and 436 nm after passing the camera optical lens 10. An ordinate in the axial aberration diagram of FIG. 2 is a normalized field of view, dimensionless, and 1.0 represents the maximum field of view. FIG. 4 illustrates a field curvature and a distortion of light with a wavelength of 546 nm after passing the camera optical lens 10, in which a field curvature S is a field curvature in a sagittal direction and T is a field curvature in a tangential direction.

In the present embodiment, the entrance pupil diameter of the camera optical lens 10 is 1.752 mm. The image height is 3.24 mm. The FOV along a diagonal direction is 82.80°. Thus, the camera optical lens 10 is an ultra-thin, large-aperture, wide-angle lens in which the on-axis and off-axis aberrations are sufficiently corrected, thereby leading to better optical characteristics.

Embodiment 2

Figure 5:
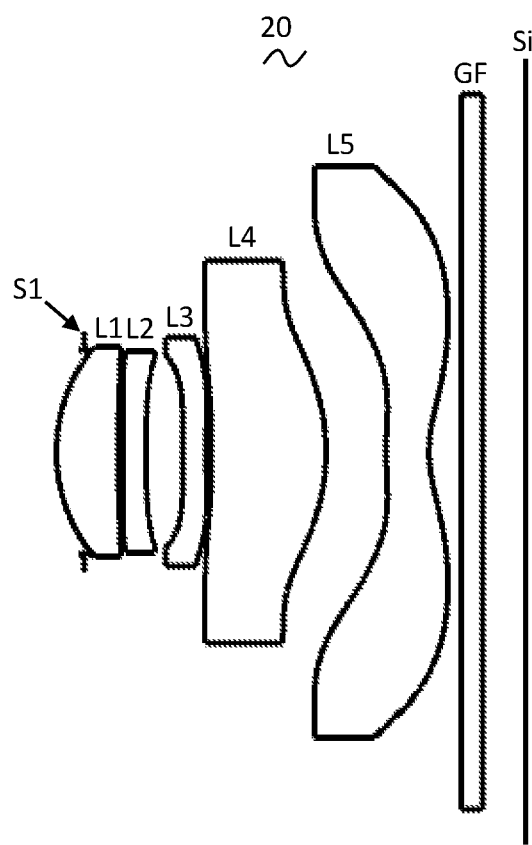
FIG. 5 is a schematic diagram of a structure of a camera optical lens according to Embodiment 2.

FIG. 5 is a structural schematic diagram of the camera optical lens 20 in Embodiment 2. Embodiment 2 is basically the same as Embodiment 1 and involves symbols having the same meanings as Embodiment 1, and the same portions will not be repeated. Only differences therebetween will be described in the following.

Table 5 and Table 6 show design data of a camera optical lens 20 in Embodiment 2 of the present disclosure.

TABLE 5

| | R | d | | nd | | vd | |
|---|---|---|---|---|---|---|---|
| S1 | ∞ | d0= | −0.257 | | | | |
| R1 | 1.362 | d1= | 0.586 | nd1 | 1.5444 | v1 | 55.82 |
| R2 | 11.840 | d2= | 0.049 | | | | |
| R3 | −18.511 | d3= | 0.210 | nd2 | 1.6610 | v2 | 20.53 |
| R4 | 7.316 | d4= | 0.353 | | | | |
| R5 | 14.118 | d5= | 0.220 | nd3 | 1.6610 | v3 | 20.53 |
| R6 | 4.802 | d6= | 0.057 | | | | |
| R7 | −12.443 | d7= | 1.089 | nd4 | 1.5444 | v4 | 55.82 |
| R8 | −1.737 | d8= | 0.571 | | | | |
| R9 | 2.685 | d9= | 0.408 | nd5 | 1.5444 | v5 | 55.82 |
| R10 | 0.942 | d10= | 0.300 | | | | |
| R11 | ∞ | d11= | 0.210 | ndg | 1.5168 | vg | 64.17 |
| R12 | ∞ | d12= | 0.407 | | | | |

Table 6 shows aspheric surface data of respective lenses in the camera optical lens 20 according to Embodiment 2 of the present disclosure.

TABLE 6

| | Conic coefficient | Aspherical surface coefficients | | | | | | | | |
|---|---|---|---|---|---|---|---|---|---|---|
| | k | A4 | A6 | A8 | A10 | A12 | A14 | A16 | A18 | A20 |
| R1 | 3.1479E−01 | −1.0820E−02 | 4.6458E−02 | −2.3598E−01 | 5.5073E−01 | −4.4480E−01 | −7.4614E−01 | 1.9609E+00 | −1.6105E+00 | 4.3953E−01 |
| R2 | 9.8995E+01 | −1.6749E−02 | 4.6465E−02 | −2.9102E−01 | 5.3457E−01 | 1.8809E+00 | −1.2482E+01 | 2.6807E+01 | −2.5924E+01 | 9.5107E+00 |
| R3 | 9.8910E+01 | 4.8245E−02 | −2.3276E−02 | 3.2341E−01 | −2.1027E+00 | 9.0592E+00 | −2.4571E+01 | 3.9686E+01 | −3.3960E+01 | 1.1816E+01 |
| R4 | 1.4566E+01 | 5.4795E−02 | 9.9504E−02 | −5.9744E−01 | 2.3835E+00 | −4.3173E+00 | 4.1218E−01 | 1.1954E+01 | −1.7956E+01 | 8.6000E+00 |
| R5 | 5.3383E+00 | −3.5665E−01 | 7.8347E−01 | −6.5035E+00 | 3.5172E+01 | −1.2769E+02 | 2.9096E+02 | −3.9953E+02 | 3.0245E+02 | −9.6915E+01 |
| R6 | 1.8538E+01 | −4.6583E−01 | 8.3387E−01 | −2.3629E+00 | 5.3277E+00 | −9.2608E+00 | 1.2001E+01 | −1.0650E+01 | 5.6090E+00 | −1.2732E+00 |
| R7 | 6.2686E+01 | −2.3187E−01 | 5.4461E−01 | −9.4336E−01 | 2.0062E+00 | −3.0856E+00 | 2.7168E+00 | −1.2906E+00 | 2.8753E−01 | −1.7323E−02 |
| R8 | −2.8646E−01 | −8.8333E−02 | 1.9740E−01 | −1.9311E−01 | 1.1962E−01 | 1.2649E−02 | −5.8505E−02 | 3.0934E−02 | −6.9115E−03 | 5.8522E−04 |
| R9 | −4.0262E+01 | −5.7152E−01 | 5.3787E−01 | −3.2713E−01 | 1.2882E−01 | −3.0152E−02 | 3.6384E−03 | −9.9699E−05 | −2.1715E−05 | 1.6582E−06 |
| R10 | −6.4274E+00 | −2.3514E−01 | 2.0308E−01 | −1.2157E−01 | 5.0504E−02 | −1.4666E−02 | 2.8916E−03 | −3.6621E−04 | 2.6704E−05 | −8.4676E−07 |

Table 7 and Table 8 show design data of inflexion points and arrest points of respective lens in the camera optical lens 20.

TABLE 7

| | Number of inflexion points | Inflexion point position 1 | Inflexion point position 2 | Inflexion point position 3 |
|---|---|---|---|---|
| P1R1 | 0 | / | / | / |
| P1R2 | 1 | 0.635 | / | / |
| P2R1 | 1 | 0.315 | / | / |
| P2R2 | 0 | / | / | / |
| P3R1 | 1 | 0.135 | / | / |
| P3R2 | 2 | 0.225 | 0.885 | / |
| P4R1 | 3 | 0.615 | 0.935 | 1.045 |
| P4R2 | 2 | 0.895 | 1.535 | / |
| P5R1 | 2 | 0.215 | 1.335 | / |
| P5R2 | 2 | 0.435 | 2.365 | / |

TABLE 8

| | Number of arrest points | Arrest point position 1 |
|---|---|---|
| P1R1 | 0 | / |
| P1R2 | 0 | / |
| P2R1 | 1 | 0.525 |
| P2R2 | 0 | / |
| P3R1 | 1 | 0.235 |
| P3R2 | 1 | 0.405 |
| P4R1 | 1 | 1.135 |
| P4R2 | 0 | / |
| P5R1 | 1 | 0.385 |
| P5R2 | 1 | 1.155 |

Table 13 below further lists various values of Embodiment 2 and parameters which are specified in the above conditions. Obviously, the camera optical lens of the present embodiment satisfies the various conditions.

Figure 6:
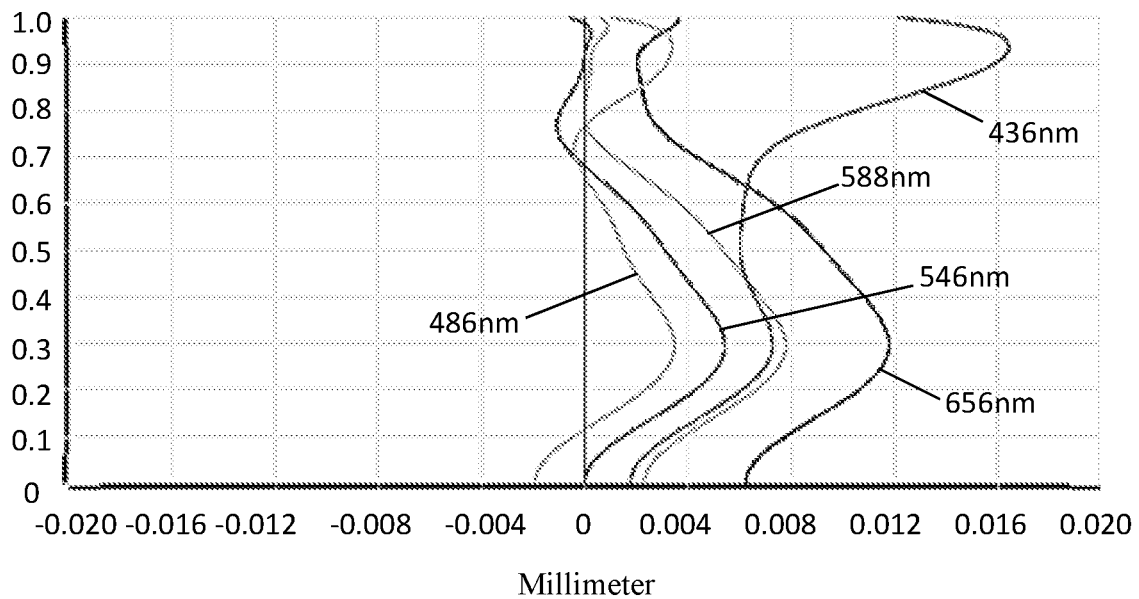
FIG. 6 is a schematic diagram of a longitudinal aberration of the camera optical lens shown in FIG. 5.
Figure 7:
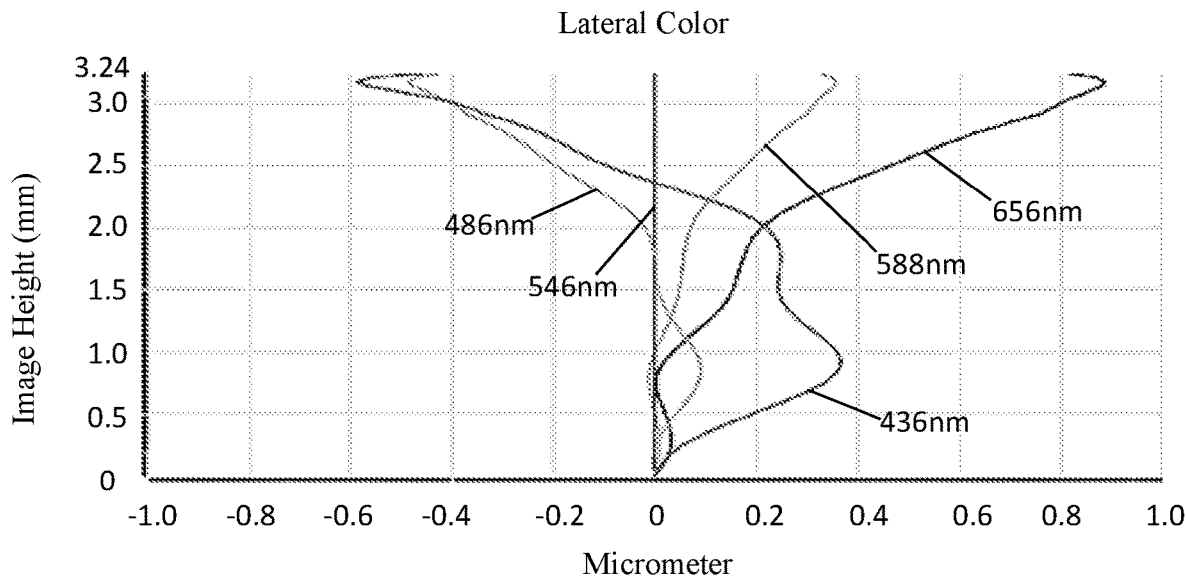
FIG. 7 is a schematic diagram of a lateral color of the camera optical lens shown in FIG. 5.
Figure 8:
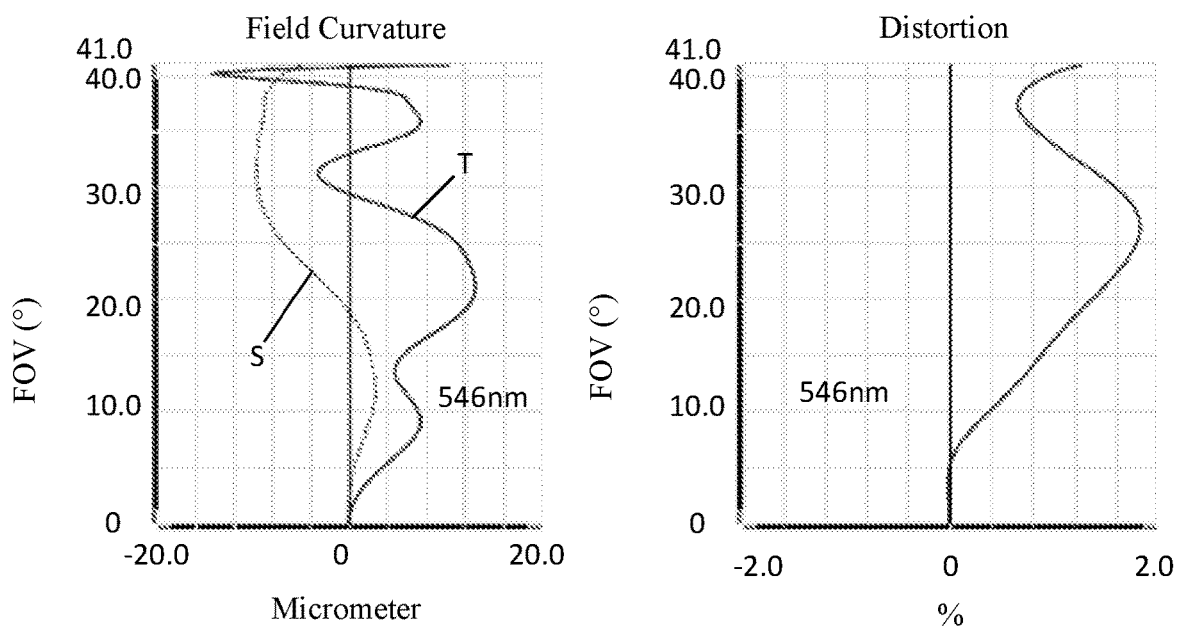
FIG. 8 is a schematic diagram of a field curvature and a distortion of the camera optical lens shown in FIG. 5.

FIG. 6 and FIG. 7 illustrate a longitudinal aberration and a lateral color of light with wavelengths of 656 nm, 588 nm, 546 nm, 486 nm and 436 nm after passing the camera optical lens 20. An ordinate in the axial aberration diagram of FIG. 6 is a normalized field of view, dimensionless, and 1.0 represents the maximum field of view. FIG. 8 illustrates a field curvature and a distortion of light with a wavelength of 546 nm after passing the camera optical lens 20, in which a field curvature S is a field curvature in a sagittal direction and T is a field curvature in a tangential direction.

In the present embodiment, the entrance pupil diameter of the camera optical lens 20 is 1.770 mm. The image height is 3.24 mm. The FOV along a diagonal direction is 82.00°. Thus, the camera optical lens 20 is an ultra-thin, large-aperture, wide-angle lens in which the on-axis and off-axis aberrations are sufficiently corrected, thereby leading to better optical characteristics.

Embodiment 3

Figure 9:
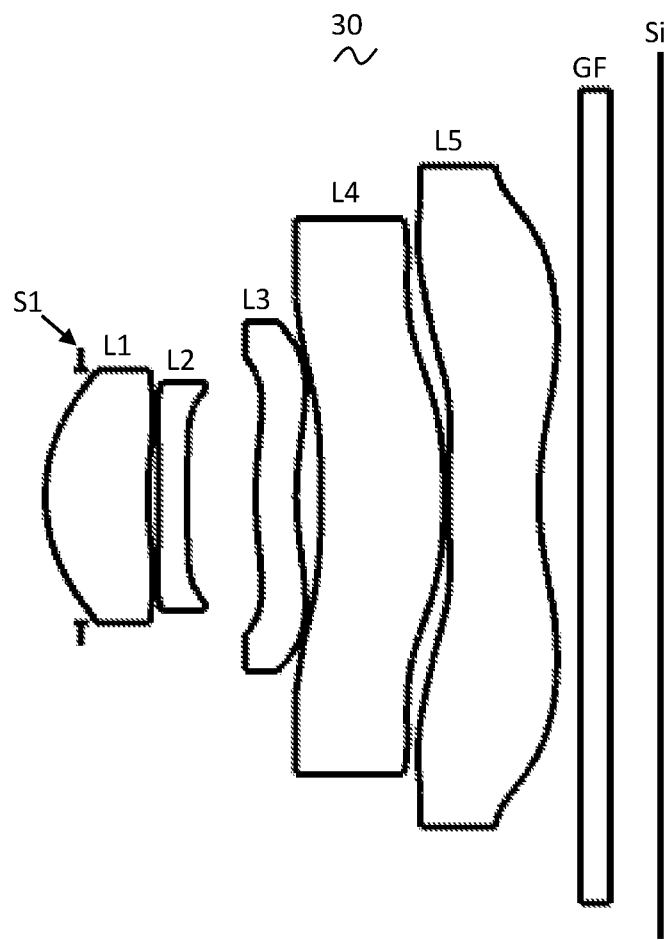
FIG. 9 is a schematic diagram of a structure of a camera optical lens according to Embodiment 3.

FIG. 9 is a structural schematic diagram of the camera optical lens 30 in Embodiment 3. Embodiment 3 is basically the same as Embodiment 1 and involves symbols having the same meanings as Embodiment 1, and the same portions will not be repeated. Only differences therebetween will be described in the following.

Table 9 and Table 10 show design data of a camera optical lens 30 in Embodiment 3 of the present disclosure.

TABLE 9

| | R | d | | nd | | vd |
|---|---|---|---|---|---|---|
| S1 | ∞ | d0 = | −0.257 | | | |
| R1 | 1.222 | d1 = | 0.733 | nd1 | 1.5444 | v1 55.82 |
| R2 | 2.600 | d2 = | 0.074 | | | |
| R3 | −2088.816 | d3 = | 0.210 | nd2 | 1.6610 | v2 20.53 |
| R4 | 176.271 | d4 = | 0.488 | | | |
| R5 | 2.637 | d5 = | 0.290 | nd3 | 1.6610 | v3 20.53 |
| R6 | 2.044 | d6 = | 0.177 | | | |
| R7 | −11.078 | d7 = | 0.883 | nd4 | 1.5444 | v4 55.82 |
| R8 | −3.713 | d8 = | 0.030 | | | |
| R9 | 7.107 | d9 = | 0.646 | nd5 | 1.5444 | v5 55.82 |
| R10 | 2.377 | d10 = | 0.300 | | | |
| R11 | ∞ | d11 = | 0.210 | ndg | 1.5168 | vg 64.17 |
| R12 | ∞ | d12 = | 0.359 | | | |

Table 10 shows aspheric surface data of respective lenses in the camera optical lens 30 according to Embodiment 3 of the present disclosure.

TABLE 10

| | Conic coefficient | Aspherical surface coefficients | | | | | | | | |
|---|---|---|---|---|---|---|---|---|---|---|
| | k | A4 | A6 | A8 | A10 | A12 | A14 | A16 | A18 | A20 |
| R1 | 7.2246E−02 | −7.7937E−02 | 8.1941E−01 | −5.8498E+00 | 2.3836E+01 | −6.0569E+01 | 9.6763E+01 | −9.4860E+01 | 5.2065E+01 | −1.2268E+01 |
| R2 | −6.0695E+01 | 2.6006E−01 | −1.6069E+00 | 5.2099E+00 | −2.8469E+01 | 1.1140E+02 | −2.4244E+02 | 2.9553E+02 | −1.9170E+02 | 5.1813E+01 |

TABLE 10-continued

| | Conic coefficient | Aspherical surface coefficients | | | | | | | | |
|---|---|---|---|---|---|---|---|---|---|---|
| | k | A4 | A6 | A8 | A10 | A12 | A14 | A16 | A18 | A20 |
| R3 | −9.9000E+01 | −7.2554E−02 | −3.8319E−01 | 3.7017E+00 | −2.5937E+01 | 1.1691E+02 | −2.9041E+02 | 4.0247E+02 | −2.9452E+02 | 8.8856E+01 |
| R4 | 9.9000E+01 | −2.7090E−02 | 1.5128E+00 | −1.0726E+01 | 5.1641E+01 | −1.2486E+02 | 1.4985E+02 | −7.0442E+01 | 0.0000E+00 | 0.0000E+00 |
| R5 | 2.9671E+00 | −2.8467E−01 | −1.1599E+00 | 2.4483E+00 | −1.1204E+01 | 2.6948E+01 | −3.8909E+01 | 3.3587E+01 | −1.6079E+01 | 3.3156E+00 |
| R6 | 1.0419E+00 | −4.0374E−01 | 6.6268E−01 | −1.4291E+00 | 2.1030E+00 | −2.1656E+00 | 1.4840E+00 | −6.3401E−01 | 1.4970E−01 | −1.4414E−02 |
| R7 | 4.6240E+01 | −1.3948E−01 | 2.1258E−01 | −4.2363E−01 | 5.6616E−01 | −3.7784E−01 | 1.1157E−01 | −1.8019E−03 | −6.2370E−03 | 9.9412E−04 |
| R8 | 4.1797E−01 | 5.4864E−02 | −4.6607E−01 | 7.4199E−01 | −5.5687E−01 | 2.4463E−01 | −6.6673E−02 | 1.1130E−02 | −1.0436E−03 | 4.2088E−05 |
| R9 | 6.6994E+00 | −2.3156E−02 | −5.3470E−01 | 8.1122E−01 | −5.7237E−01 | 2.3377E−01 | −5.8383E−02 | 8.8153E−03 | −7.4052E−04 | 2.6598E−05 |
| R10 | −1.5464E+00 | −4.5684E−02 | −1.2184E−01 | 1.4970E−01 | −9.2504E−02 | 3.5062E−02 | −8.3477E−03 | 1.2043E−03 | −9.5444E−05 | 3.1733E−06 |

Table 11 and Table 12 show design data of inflexion points and arrest points of respective lens in the camera optical lens 30.

TABLE 11

| | Number of inflexion points | Inflexion point position 1 | Inflexion point position 2 | Inflexion point position 3 |
|---|---|---|---|---|
| P1R1 | 1 | 0.845 | / | / |
| P1R2 | 1 | 0.365 | / | / |
| P2R1 | 1 | 0.505 | / | / |
| P2R2 | 0 | / | / | / |
| P3R1 | 2 | 0.395 | 1.005 | / |
| P3R2 | 2 | 0.445 | 1.255 | / |
| P4R1 | 2 | 0.925 | 1.385 | / |
| P4R2 | 2 | 0.915 | 1.675 | / |
| P5R1 | 3 | 0.315 | 1.035 | 2.105 |
| P5R2 | 2 | 0.605 | 2.125 | / |

TABLE 12

| | Number of arrest points | Arrest point position 1 | Arrest point position 2 |
|---|---|---|---|
| P1R1 | 0 | / | / |
| P1R2 | 1 | 0.605 | / |
| P2R1 | 1 | 0.615 | / |
| P2R2 | 0 | / | / |
| P3R1 | 1 | 0.665 | / |
| P3R2 | 1 | 0.785 | / |
| P4R1 | 0 | / | / |
| P4R2 | 2 | 1.575 | 1.765 |
| P5R1 | 2 | 0.505 | 1.885 |
| P5R2 | 1 | 1.185 | / |

Table 13 below further lists various values of Embodiment 3 and parameters which are specified in the above conditions. Obviously, the camera optical lens of the present embodiment satisfies the various conditions.

Figure 10:
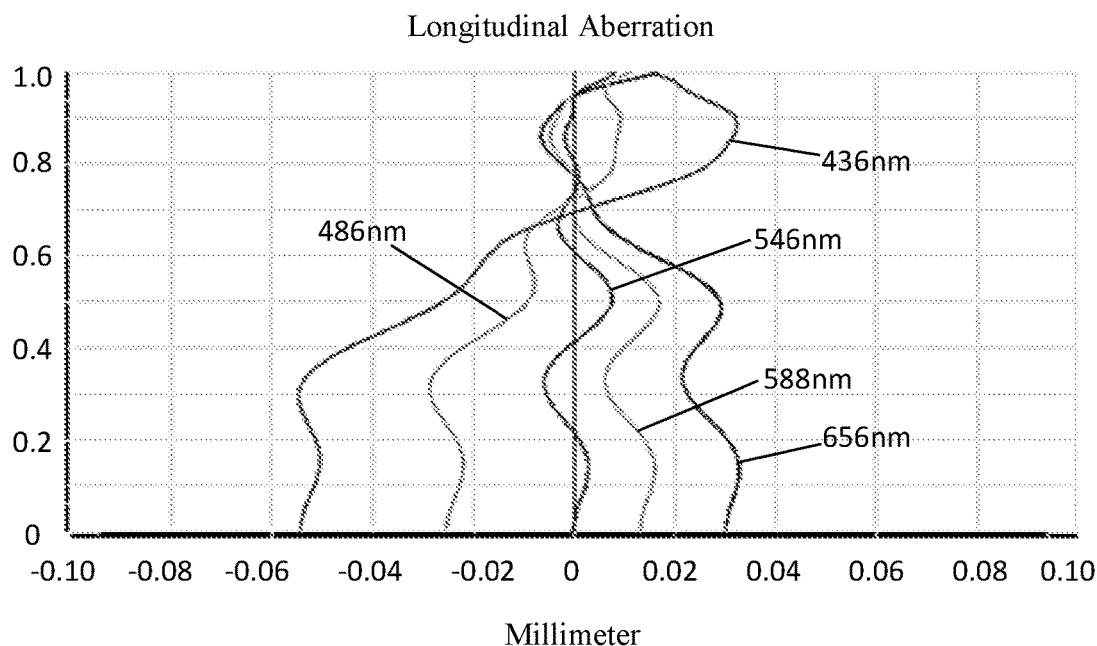
FIG. 10 is a schematic diagram of a longitudinal aberration of the camera optical lens shown in FIG. 9.
Figure 11:
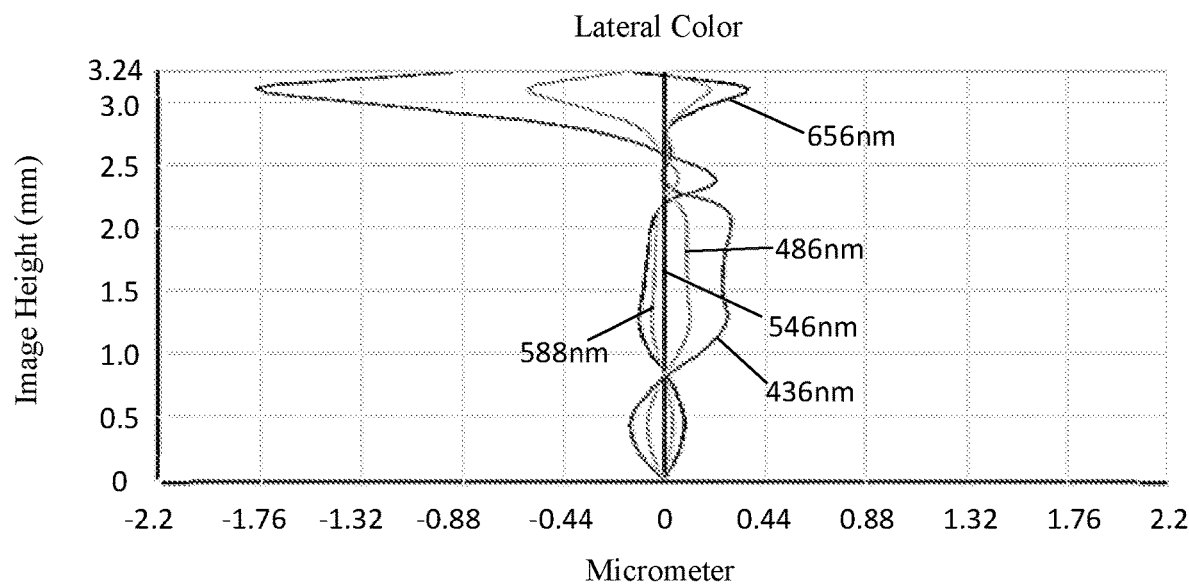
FIG. 11 is a schematic diagram of a lateral color of the camera optical lens shown in FIG. 9.
Figure 12:
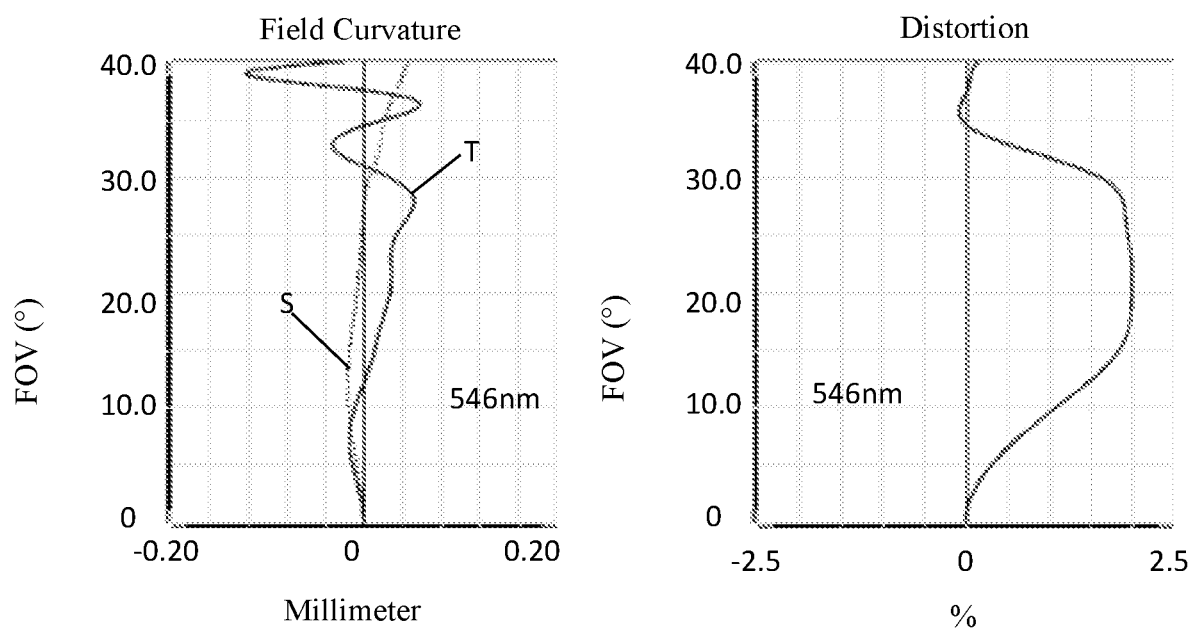
FIG. 12 is a schematic diagram of a field curvature and a distortion of the camera optical lens shown in FIG. 9.

FIG. 10 and FIG. 11 illustrate a longitudinal aberration and a lateral color of light with wavelengths of 656 nm, 588 nm, 546 nm, 486 nm and 436 nm after passing the camera optical lens 30. An ordinate in the axial aberration diagram of FIG. 10 is a normalized field of view, dimensionless, and 1.0 represents the maximum field of view. FIG. 12 illustrates a field curvature and a distortion of light with a wavelength of 546 nm after passing the camera optical lens 30, in which a field curvature S is a field curvature in a sagittal direction and T is a field curvature in a tangential direction.

In the present embodiment, the entrance pupil diameter of the camera optical lens 30 is 1.841 mm. The image height is 3.24 mm. The FOV along a diagonal direction is 80.00°. Thus, the camera optical lens 30 is an ultra-thin, large-aperture, wide-angle lens in which the on-axis and off-axis aberrations are sufficiently corrected, thereby leading to better optical characteristics.

Table 13 below further lists various values of Embodiment 1, Embodiment 2, and Embodiment 3 and parameters which are specified in the above conditions.

TABLE 13

| Parameters and Conditions | Embodiment 1 | Embodiment 2 | Embodiment 3 |
|---|---|---|---|
| f1/f | 0.80 | 0.76 | 0.94 |
| f3/f | −3.79 | −3.03 | −4.49 |
| (R5 + R6)/(R5 − R6) | 2.38 | 2.03 | 7.89 |
| d7/d5 | 3.75 | 4.95 | 3.05 |
| R3/R4 | −4.55 | −2.53 | −11.85 |
| f | 3.590 | 3.626 | 3.772 |
| f1 | 2.888 | 2.760 | 3.550 |
| f2 | −8.229 | −7.818 | −243.141 |
| f3 | −13.591 | −10.989 | −16.920 |
| f4 | 3.299 | 3.564 | 9.800 |
| f5 | −2.822 | −2.892 | −6.864 |
| f12 | 4.023 | 3.841 | 3.588 |
| Fno | 2.05 | 2.05 | 2.05 |

The above are only the embodiments of the present disclosure. It should be understand that those skilled in the art can make improvements without departing from the inventive concept of the present disclosure, and these improvements all belong to the scope of the present disclosure.

What is claimed is:

1. A camera optical lens, comprising, from an object side to an image side:
   a first lens having a positive refractive power;
   a second lens having a negative refractive power;
   a third lens having a negative refractive power;
   a fourth lens having a positive refractive power; and
   a fifth lens having a negative refractive power,
   wherein the camera optical lens satisfies following conditions:

$0.75 \leq f1/f \leq 0.95$;

$-4.50 \leq f3/f \leq -3.00$;

$2.00 \leq (R5+R6)/(R5-R6) \leq 8.00$;

$3.00 \leq d7/d5 \leq 5.00$; and $-12.00 \leq R3/R4 \leq -2.50$, where
   f denotes a focal length of the camera optical lens;
   f1 denotes a focal length of the first lens;
   f3 denotes a focal length of the third lens;
   R3 denotes a curvature radius of an object side surface of the second lens;

R4 denotes a curvature radius of an image side surface of the second lens;
R5 denotes a curvature radius of an object side surface of the third lens;
R6 denotes a curvature radius of an image side surface of the third lens;
d5 denotes an on-axis thickness of the third lens; and
d7 denotes an on-axis thickness of the fourth lens.

2. The camera optical lens as described in claim 1, further satisfying a following condition:

$$0.10 \leq R1/R2 \leq 0.50,$$

where
R1 denotes a curvature radius of an object side surface of the first lens; and
R2 denotes a curvature radius of an image side surface of the first lens.

3. The camera optical lens as described in claim 1, further satisfying following conditions:

$$-5.55 \leq (R1+R2)/(R1-R2) \leq -0.84; \text{ and}$$

$$0.06 \leq d1/TTL \leq 0.25,$$

where
R1 denotes a curvature radius of an object side surface of the first lens;
R2 denotes a curvature radius of an image side surface of the first lens;
d1 denotes an on-axis thickness of the first lens; and
TTL denotes a total optical length from the object side surface of the first lens to an image plane of the camera optical lens along an optic axis.

4. The camera optical lens as described in claim 1, further satisfying following conditions:

$$-128.92 \leq f2/f \leq -1.44;$$

$$0.22 \leq (R3+R4)/(R3-R4) \leq 1.27; \text{ and}$$

$$0.02 \leq d3/TTL \leq 0.07,$$

where
f2 denotes a focal length of the second lens;
d3 denotes an on-axis thickness of the second lens; and
TTL denotes a total optical length from an object side surface of the first lens to an image plane of the camera optical lens along an optic axis.

5. The camera optical lens as described in claim 1, further satisfying a following condition:

$$0.02 \leq d5/TTL \leq 0.10,$$

where
TTL denotes a total optical length from an object side surface of the first lens to an image plane of the camera optical lens along an optic axis.

6. The camera optical lens as described in claim 1, further satisfying following conditions:

$$0.46 \leq f4/f \leq 3.90;$$

$$0.66 \leq (R7+R8)/(R7-R8) \leq 3.01; \text{ and}$$

$$0.10 \leq d7/TTL \leq 0.37,$$

where
f4 denotes a focal length of the fourth lens;
R7 denotes a curvature radius of an object side surface of the fourth lens;
R8 denotes a curvature radius of an image side surface of the fourth lens; and
TTL denotes a total optical length from an object side surface of the first lens to an image plane of the camera optical lens along an optic axis.

7. The camera optical lens as described in claim 1, further satisfying following conditions:

$$-3.64 \leq f5/f \leq -0.52;$$

$$0.87 \leq (R9+R10)/(R9-R10) \leq 3.12; \text{ and}$$

$$0.05 \leq d9/TTL \leq 0.22,$$

where
f5 denotes a focal length of the fifth lens;
R9 denotes a curvature radius of an object side surface of the fifth lens;
R10 denotes a curvature radius of an image side surface of the fifth lens;
d9 denotes an on-axis thickness of the fifth lens; and
TTL denotes a total optical length from an object side surface of the first lens to an image plane of the camera optical lens along an optic axis.

8. The camera optical lens as described in claim 1, further satisfying a following condition:

$$TTL/IH \leq 1.38,$$

where
IH denotes an image height of the camera optical lens; and
TTL denotes a total optical length from an object side surface of the first lens to an image plane of the camera optical lens along an optic axis.

9. The camera optical lens as described in claim 1, further satisfying a following condition:

$$FOV \geq 80°,$$

where
FOV denotes a field of view of the camera optical lens.

10. The camera optical lens as described in claim 1, further satisfying a following condition:

$$0.48 \leq f12/f \leq 1.68,$$

where
f12 denotes a combined focal length of the first lens and the second lens.

* * * * *